United States Patent [19]

Bonitz et al.

[11] Patent Number: 4,593,553

[45] Date of Patent: Jun. 10, 1986

[54] METHOD FOR DETECTING ENGINE KNOCK IN INTERNAL COMBUSTION ENGINES

[75] Inventors: Jörg Bonitz, Mühlacker; Robert Entemann, Benningen; Bernhard Miller, Stuttgart; Siegfried Rohde, Schwieberdingen; Stefan Unland, Ludwigsburg; Walter Viess, Schwieberdingen, all of Fed. Rep. of Germany

[73] Assignee: Robert Bosch GmbH, Stuttgart, Fed. Rep. of Germany

[21] Appl. No.: 587,996

[22] Filed: Jul. 23, 1984

[30] Foreign Application Priority Data

Mar. 10, 1983 [DE] Fed. Rep. of Germany ....... 3308541

[51] Int. Cl.$^4$ ............................................. G01L 23/22
[52] U.S. Cl. .............................................................. 73/35
[58] Field of Search ...................... 73/35; 123/425, 435; 364/431.08

[56] References Cited

U.S. PATENT DOCUMENTS

| 4,320,729 | 3/1982 | Sawada et al. | 73/35 |
| 4,478,068 | 10/1984 | Bonitz et al. | 73/35 |
| 4,521,769 | 6/1985 | Dudeck et al. | 73/35 |

Primary Examiner—Stewart J. Levy
Assistant Examiner—John E. Chapman, Jr.
Attorney, Agent, or Firm—Frishauf, Holtz, Goodman & Woodward

[57] ABSTRACT

A demodulated audio signal for detection of engine-knock is digitalized to produce a sequence of digital signals corresponding to the various cylinders of the engine in turn. These digital signals are recursively filtered by applying a factor k to a newer value and its complement (1−k) to an older value from the same cylinder or a value obtained therefrom by partial filtering and the sum of the two factor-modified terms is formed to provide a reference value with which the most recent digital signal is compared, to produce an indication of engine-knock when the latter exceeds a reference value by a predetermined amount. The factor k is varied in accordance with acceleration of engine speed or with the level of signals from the vibration sensor that exists before the application of automatic gain control prior to integration. The system, which can be implemented mostly in the software of a microcomputer, also includes provisions for adjusting from time to time minimum reference signal values for each of the cylinders, which are to be substituted for the reference signal values contemporaneously produced by recursive filtering if the latter fail to exceed the former in magnitude, and also for determining, at appropriate times, failures of the knock detection system from the absence of normal variations between the integrated signals from the respective cylinders, and providing corrective action in response thereto.

7 Claims, 4 Drawing Figures

METHOD FOR DETECTING ENGINE KNOCK IN INTERNAL COMBUSTION ENGINES

This invention concerns a knock detection system for gasoline engines, especially in motor vehicles, of the kind in which an audio frequency signal is detected during a particular time window in the cycle of each of the cylinders of the engine, and is compared with a reference signal, more particularly a system in which the detected signal is integrated by means of a recursive filter using a weighting factor k which determines the degree of integration.

BACKGROUND AND PRIOR ART

It is known that so-called knocking can take place in a gasoline engine under particular operating circumstances. By such knocking is understood the generation of shockwaves of the fuel-air mixture which are noticeable as audio frequency vibrations of the motor and sometimes otherwise too. Since a heavy thermal loading of the internal cylinder walls and of the piston takes place as a rule when the engine knocks, with the possibility of wearing off material from these surfaces, efforts are made for basically avoiding knocking of the engine, since prolonged appearances of that phenomenon can lead to damage or destruction of the engine.

Since efforts are also made to utilize as far as possible the available working range of the engine (with regard to an optimum development of torque or of combustion efficiency), there is a need for recognition of knocking of the engine as soon and as reliably as possible. Along with the problem of making available suitable sensors for detecting engine knock, there is also the problem of measurement technology to read out the knock signal reliably and free of disturbance from the oscillations of the engine detected by the sensor, in order to be able to control the engine in a manner corresponding to the presence of a knock recognition signal that is either positive ("knock yes") or negative ("knock no").

A method and apparatus for recognizing engine knock is shown in German Published Patent Application DE-OS No. 31 37 016, which corresponds to U.S. Pat. No. 4,478,068 and in which a useful signal relates to engine knock is compared with a reference signal. The reference signal in this case is formed after the fashion of an output sequence of a digital filter and provides, more particularly, a recursive function made up repetitively from the latest useful signal value and the last previous value of reference signal. For a knock recognized as validly shown, an output signal is produced when the useful signal exceeds the reference signal in a prescribed way. A problem in such a process or such an apparatus is that in the case of a failure of the detection of the useful signal no error recognition is possible, which can lead to damage to the engine from the knock control system subsequently providing more or less continuous spark advance.

A knock detector is also disclosed in U.S. Pat. No. 4,012,942 in which the measured knock signal is compared with a reference signal which is generated by a function generator in a manner dependent on the engine speed. This method has the disadvantage that the background noise of the engine which in fact is present is not taken into consideration. In this system, notably, no account is taken of the particular mode of the engine's operation, and no account is taken of the engine's various adjustments or the aging condition of the engine.

SUMMARY OF THE INVENTION

It is an object of the present invention to provide an engine knock detection and evaluation method and apparatus, in which both the presence and level of engine noise and the variation of engine operating conditions from mode of operation or aging are taken into account, with a minimum of additional apparatus and expense.

Briefly, the weighting factor k which determines the integrating characteristic of the recursive filter is made to be dependent upon the acceleration of engine speed. For example, a reference signal $y(t_i)$ is continuously formed according to the formula $$y(t_i) = (1-k) \cdot y(t_{i-1}) + k x(t_i),$$

where i is the ordinal number index of combustion cycles in an individual cylinder, and k is a factor, conveniently expressed in negative powers of 2, that may be readily shifted up and down and as readily applied to a digital signal in accordance with engine conditions.

The method and apparatus of the invention have the advantage that engine knock recognition can be carried out with great reliability. Gradually growing disturbance levels, arising, for example, by valve noise during the measurement window, do not interfere with the knock recognition, because the reference signal waxes and wanes in step with these slow amplitude changes.

Useful further developments of the invention are possible, for example, by sometimes or always comparing successive integrator values and sometimes or always comparing corresponding integrator values of successive combustion cycles on a running basis. In the former case, if the difference between successive integrator values fails to exceed a prescribed value, it is possible to observe that a failure, perhaps a disconnection of a knock sensor lead, has occurred, as the result of which observation some action can be taken to prevent endangering the engine by a malfunctioning knock control. The further advantage is obtained in such case that the failure observation in no way requires additional hardware and the function is performed entirely on a programming basis in more or less computerized control of the engine.

BRIEF DESCRIPTION OF THE DRAWINGS

The invention is further described by way of illustrative example with reference to the annexed drawings, in which.

DESCRIPTION OF THE ILLUSTRATED EMBODIMENTS

Figure 1:
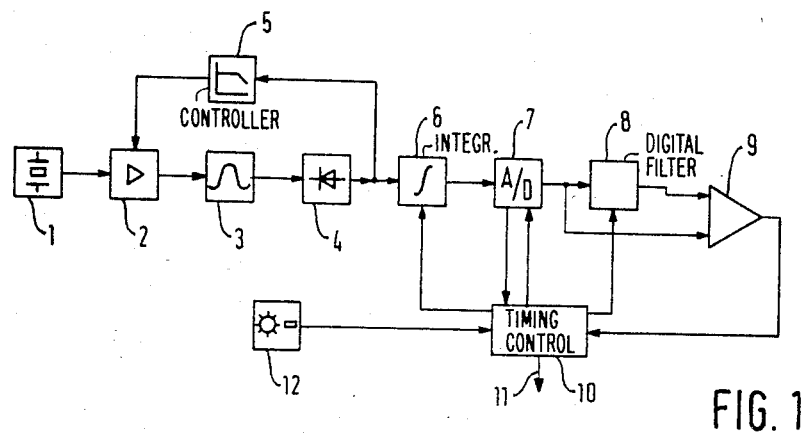
FIG. 1 is a circuit block diagram of a circuit constituting a first embodiment of the invention.

In the embodiment shown in FIG. 1, a knock sensor 1 is connected through a gain-controlled amplifier 2 and a bandpass filter 3 to a demodulator circuit 4. The output of the demodulator 4 is connected on one hand through a controller circuit 5 to the gain-controlled amplifier 2 and, on the other hand, to an integrator 6. The integrator 6 is operative only during a "time window" in accordance with conventional practice in knock detection, by means of a control unit 10, preferably a microprocessor, which can keep track of the crankshaft position by the pulses of the engine speed sensor 12 and another sensor usually provided and not shown in the drawings known as a reference mark sensor.

The output of the integrator 6 is supplied to an analog-to-digital converter 7, the output of which is furnished on the one hand to a digital filter 8 and on the other hand to one input of a comparator 9 which is preferably constituted as a digital comparator.

The output of the digital filter 8 is connected to another input of the comparator 9. The integrator 6, analog-to-digital converter 7 and digital filter 8 are controlled by the control unit 10 which provides timing signals for the various steps of operation, such as are illustrated below with reference to FIG. 3. The timing control unit 10, especially when constituted as a microprocessor as preferred, also receives the output of the comparator 9, on the basis of which it furnishes an output signal 11 indicating whether or not an engine knock is detected.

The manner of operation of the system of FIG. 1 is as follows. The signals picked and furnished by the knock sensor 1 are amplified in the amplifier 2 and then furnished to the bandpass filter 7, which preferentially passes the knock signals, in contrast to noise at frequencies outside of the knock signal range, and supplies the filtered signals to the demodulator circuit 4 which can be constituted simply as a rectifier. The controller circuit 5 consists essentially of a low-pass filter. From the demodulated signal it provides a control magnitude that reduces the amplification of the controlled amplifier when large signals are delivered from the knock sensor 1 and makes the amplification greater when the signals delivered by the knock sensor 1 are smaller (automatic gain control). By this control of the amplification factor the result is obtained that the output signal of the controlled amplifier 2 and likewise of the demodulator 4 is to a great extent constant (in amplitude in the first case) and independent of motor speed, because the signal amplitude of the knock sensor 1 increases with motor speed.

As already mentioned briefly, the output voltage of the demodulator circuit 4, during a measurement time-window synchronized with crankshaft revolution, is integrated beginning afresh from zero at the beginning of each measurement window. The window is defined and controlled by the timing control unit 10, as already mentioned, in a manner dependent upon the speed sensor 12 and is caused to turn on the integrator 6 for the corresponding period. At the end of the measurement window, the output voltage of the integrator 6 is digitalized in the analog-to-digital converter 7, the timing control 10 furnishing the order to convert and receiving a signal from the analog to digital converter 7 which indicates the completion of the conversion. The number sequence produced at the output of the analog-to-digital converter 7 is supplied to the input of the digital filter 8 which is constituted as a digital filter of the first order having a low-pass behavior. The digital filter 8, in repsonse to that input, produces an output sequence of numbers which are successively compared in the compartor 9 with the digitalized current measurement value provided by the analog-to-digital converter 7. Since the comparator 9 is a digital comparator, a particular minimum difference required between the compared values in order to produce a signal recognizing the existence of engine knock may be incorporated either in the comparator or in the unit 10.

Figure 2:
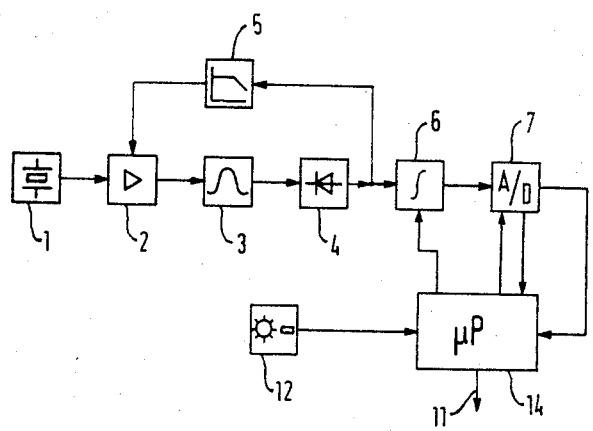
FIG. 2 is a circuit block diagram of a second embodiment of the invention.

The embodiment of FIG. 2 differs from that of FIG. 1 in that the digital filter 8 is simulated or effectively constituted in a computing unit 14 constituted as a microcontroller and the comparator 9 is incorporated in the computing unit 14 as programmed. The analog-to-digital converter 7 delivers the digitalized measurement value at the end of every measurement window to the computing unit 14. By a counting operation within the computing unit 14, in a cycle corresponding to the number of cylinders, and therefore carried out in a manner dependent upon cylinder recognition, the digitalized output signals of the analog-to-digital converter respectively corresponding to the individual cylinders are supplied to storage locations respectively allocated to the individual cylinders.

The reference signal that is determined anew for every single measurement value delivered by the knock sensor is obtained, either by circuitry in the digital filter 8 according to FIG. 1, or by programmed calculation in the computer unit 14 in accordance with FIG. 2, after the manner of a digital filter, corresponding to the following formula:

$$y(t_i) = (1-k) \cdot y(t_{i-1}) + kx(t_i),$$

where $y(t_i)$ is the reference value calculated in each case, i the count index of the combustion cycles of an individual cylinder, $x(t_i)$ the digitalized measurement value provided by the analog-to-digital converter 7 to the filter 8 or the computer 14, and k the factor with which the contemporary measurement value is weighted for computation of the new reference value.

The factor k is empirically determined in a manner dependent upon either the acceleration of engine speed $(d\omega/dt)$ or upon the amplitude level of the sensor signals in the particular cylinder in question (the latter can be obtained from the value of the gain control signal applied to the amplifier 2 during the corresponding measurement window).

Figure 3:
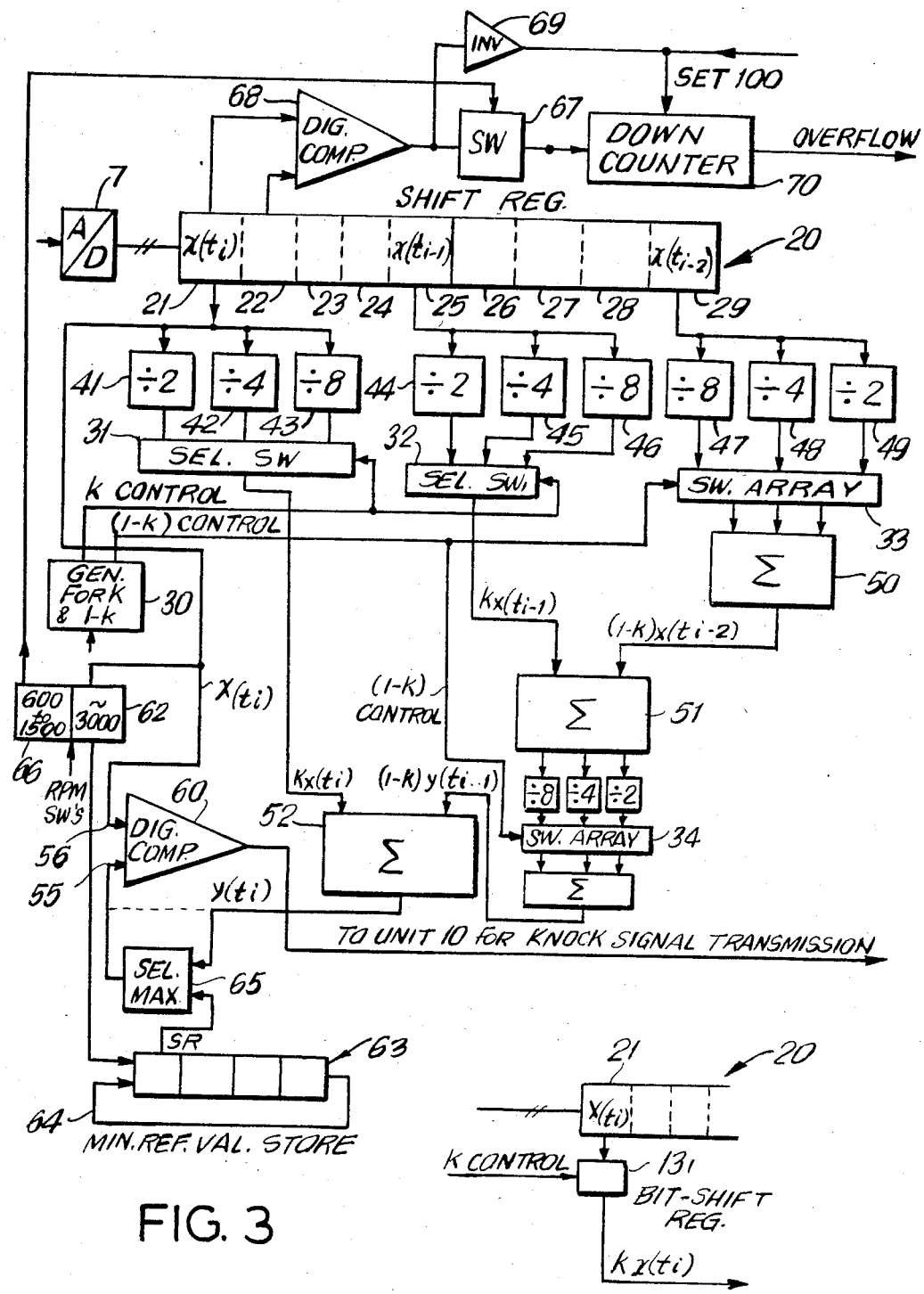
FIG. 3 is a circuit block diagram of the units 7, 8 and 9 of the embodiment in FIG. 1 with certain additional features, in a form illustrative of a computation performed which may also be performed by "software" in the embodiment of FIG. 2.

The formation of the reference value is illustrated in FIG. 3 on a circuit block basis. A flow chart similar to FIG. 3 would describe the corresponding operation by the computer 14 of FIG. 2.

In FIG. 3, the analog-to-digital converter 7 delivers successive digital signals to the first cell 21 of a shift register 20. There are omitted from FIG. 3 the circuits involved in providing clocking pulses from the timing control unit 10 to the converter 7, shift register 20 and various other components shown in FIG. 3 presently to be described. These circuits are well known in the art and do not need to be further described here. As each new value is delivered by the converter 7, the previous value or values are advanced by one cell in the shift register, so that when the value $x(t_i)$ has been delivered by the converter 7 into the cell 21, the previous value $x(t_{i-1})$ for the same cylinder (assuming a four-cylinder engine) will be located in cell 25 and the next earlier value $x(t_{1-2})$ will be located in the last cell 29. To apply the factor k, the value is divided by 2, 4 or 8 (in fact divisions by still higher powers of 2 can also be provided, those shown being sufficient for purposes of illustration). Division by 2 provides a 50% k factor, and so on. Division by powers of 2 is performed because it can be accomplished by simply shifting the binary digital representation of the measured value by a corresponding number of places to the right. The selected factor k, as well as its complement (1−k), is generated by the generator 30 that is controlled as will be described shortly, being provided in the form of signals for operating the selector switches 31 and 32 to select the appropriate dividing circuit, in the case of a factor k, and in the form suitable for operating the switch arrays 33 and 34, in the case of the complement. A set of dividing circuits is provided for the output of cell 21, namely the circuits 41, 42 and 43, another set for the output of cell 25, namely the circuits 44, 45 and 46, and for the output of cell 29, namely the circuits 47, 48 and 49. For understanding the operation of the circuit of FIG. 3, it is necessary first to trace the formation of the reference value magnitude $y(t_{i-1})$ for the last previous signal for the same cylinder delivered by the converter 7, i.e. for the signal $x(t_{i-1})$. This reference value is delivered by the summing circuit 51 to the summing circuit 52, these summing circuits being essentially digital addition circuits (it is further obvious that the summing circuits 50 and 51 may be combined, as shown in the case of the summing circuit 52, but it is easier to understand the diagram if 50 and 51 are shown separately). To produce the value furnished by the summing circuit 51 the digital value $x(t_{i-1})$ present in cell 25 is divided by one of the dividing circuits 44, 45 and 46 selected by the switch 32 in accordance with the value of k then being furnished by the generator 30. The switch array 33 is at the same time operated in a complementary fashion by the generator 30, which is to say that if, for example, k is 25% (dividing circuit 45 selected by the switch 32), 75% of the value in the cell 29 must be obtained for the summing circuit 51 and that is done by connecting the dividing circuits 48 and 49 through the switch 33 to the summing circuit 50, the output of which can then be furnished to the summing circuit 51. As already mentioned, the dividing circuits are really simply shift circuits since division is by a power of 2.

It is now required, in order to form the new reference value, to divide the value in the cell 21 by one of the dividing circuits 41, 42 and 43 selected by the switch 31 in accordance with the value of k provided by the generator 30. The output of the switch 31 then goes to the summing circuit 52 where it is added to (1−k) times the output of the summing circuit 51 to produce the input 55 to the comparator 60 where it is compared with the input 56 which is simply the content of the cell 21 itself. If the latter is sufficiently greater than the reference value at the input 55, a knock signal will be produced. By providing a longer shift register 20 and more stages of summation, the sum multiplied by (1−k) and then furnished to form $y(t_i)$ in the summing circuit 52 can very closely approximate the last previous value of $y(t_i)$, namely $y(t_{i-1})$.

The value of k can vary with acceleration of engine speed or with the noise level in the particular cylinder, which means that it might vary cyclically as well as otherwise.

Figure 4:
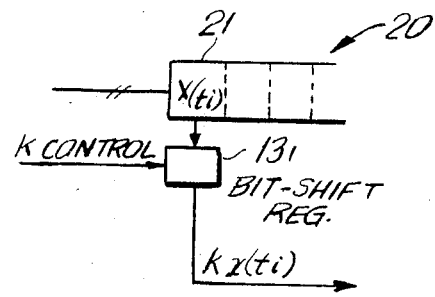
FIG. 4 is a diagram of a simplified embodiment of a portion of the system of FIG. 3.

FIG. 4 shows a simpler way of applying the factor k to the content of cell 21, for example, of the shift register 20. Here the bit-shift register shifted by a number of steps commanded by the k-control line 131 replaces both the selector switch 31 and the dividers 41, 42 and 43 which were shown separately in FIG. 3 to facilitate illustration of the computation. The bit-shift register 20 could correspond closely to a register operated for the same purpose in the microprocessor 14.

In order to avoid false recognition of knock conditions, a minimum reference signal level is stored either in the shift register 63 (FIG. 3) or in the computer unit 14 (FIG. 2). If the reference value generated in accordance to the formula above given drops below this minimum level, the minimum reference value level is used for comparison with the measured value instead of the reference value. If, during operation of the engine, the engine speed lies in a range around a particular value, for example within 250 r.p.m. above or below 3000 r.p.m., where engine knock is normally not detected, the measured values will be stored. These are generally specifically different for the different cylinders. In consequence, the minimum reference value level will be raised or lowered, i.e. prefected by a factor, so that the minimum reference levels are proportional to each other and accordingly behave in the same way, with respect to each other, as the reference values generated in the manner already described with reference to FIG. 3.

The provision of the minimum reference values is indicated symbolically in FIG. 3 on a hardware basis by the r.p.m. switch 62 and the shift register 63 in which the values are allowed to circulate around the feedback 64 when the engine speed is such that new values are not being fed through the speed range switch 62. Then the maximum selecting circuit 65 substitutes the minimum reference value for the normally computed reference value when the latter falls below the value of the minimum reference value. The minimum reference values may, for example, be made dependent on engine speed.

The provision of cylinder-specific minimum reference values provides automatic adaptation to the different background noise levels in the various cylinders as perceived by the knock sensor or sensors. This adaptation is carried out at intervals, timed by the switch 62 in FIG. 3, each measuring 1,000 combustion cycles and in a manner dependent on particular operating parameters of the engine, for example less often in starting, and more frequently at high temperatures.

The recognition of knock-producing combustion takes place cylinder-specifically, with reference values being called out which are stored in locations corresponding to the respective cylinders and the determination being made anew in each cycle with a newly obtained contemporaneous measured value. By means of the knock recognition signal 11, the ignition timing for each cylinder can be individually determined so as to relieve against knock-generating combustion in the respective cylinders. For the reference value there can be used, as already explained, the output sequence $y(t_i)$, but it is also possible to utilize as a reference value the value $y(t_{i-1})$ (produced in FIG. 3 by the summing circuit 51) when it is desired that the reference value should not contain the contemporaneously measured value. It is further possible, in case $y(t_{i-1})$ is utilized as a reference value for knock recognition, and the measured value $x(t_{i-1})$ has already been recognized to correspond to knock-generating combustion, the contemporaneous measured value $t(t_i)$ in the formation of the new reference value $y(t_i)$, or else to introduce the newly measured value to the extent of only a certain fraction thereof. Such operation can be provided by making the factor k, as applied by only the selector switch 31 in FIG. 3 while its complement is accordingly applied to the switch array 34, equal to zero in the first case, or smaller than it otherwise would be made, perhaps very much smaller. The normal factors would still be applied to units 32 and 33 in such case. In this way, a disproportionately strong rise of the reference value during knock-generating combustion can be prevented.

During operation of the engine in a speed range between 600 r.p.m. and 1500 r.p.m., the succeeding integrator outputs digitalized by the converter 7 are continuously compared with each other, so that a running difference between succeeding integration values is formed. This is shown in hardware fashion on FIG. 3 by the r.p.m switch 66, 67 and the digital comparator 68. At the beginning of this difference formation, somewhat after the start, a counter in the computer unit 14 of FIG. 2, represented in FIG. 3 by the counter 70 has its contents set to the initial value 100. Whenever the difference amount exceeds a prescribed minimum difference amount, a decision which is to be understood as included in the operation of the comparator 68, the counter is decremented, and when the difference does not exceed the prescribed minimum difference, the counter is reset to 100 as indicated by the operation of the inverter 69 at the output of the comparator 68. Whenever as a result of decrementing of the counter 70 the count condition zero is reached, a so-called overflow signal initiates a safety program in the computer 14 by which, through some ignition retarding as may be necessary, the ignition timing is made to correspond to a non-damaging operating condition for all expectable modes of operation. The overflow signal of the counter 70 could of course also be made to produce such a result by appropriate circuitry in the case of the embodiment of FIG. 1.

If now a failure occurs in the controlled amplifier 2, the successive integration values will all be the same, and generally situated continuously at the upper supply voltage. After 100 combustion events, the count condition 0 is reached and the safety program is activated. In normal conditions of operation, as a result of differences in cylinder behavior and as a result of the control operation of the knock detection system, differences between successive integration values will appear which will exceed the prescribed minimum difference amount, so that the counter will again be reset to 100.

Although this last mentioned function has been described with reference to FIG. 3, such a monitoring function would normally be provided in the software of the control unit 10 or of the computer unit 14. Consequently, it requires no further provisions of hardware such as monitoring lines or test lines which would simulate the sensor signal. The monitoring goes into effect right after the start and again every time when the engine is operating in the neighborhood of its normal idling speed, so that sufficiently frequent monitoring takes place. The reloading of the counter with a number like 100 has the effect that chance sequences of difference amounts that are less than the minimum difference will not lead to a false activation of the safety program.

Although the invention has been described with reference to particular illustrative examples, it will be recognized that modifications and variations are possible within the inventive concept.

We claim:

1. Method of reliable and early detection of knocking in a multi-cylinder internal combustion engine by sensing, filtering and demodulating an audio frequency signal representing engine vibrations and integrating said signal during crankshaft-timed window periods, converting the resulting integrated signal from analog to digital form and then comparing the integrated digital signal with a reference signal obtained by recursive digital filtering of a succession of integrated digital signals relating to the same engine cylinder as the signal compared with said reference signal, said digital filtering being performed by applying a weighting factor k and its complement respectively to at least one pair of said successive integrated digital signals, said method further comprising the step of:

providing said factor k and its complement (1−k) in a manner dependent on acceleration of engine speed.

2. Method according to claim 1, in which said reference signal is produced from a succession of integrated digital signals which does not include the integrated digital signal with which said reference signal is to be compared.

3. Method according to claim 1, in which said reference signal is normally produced from a succession of integrated digital signals which includes the integrated digital signal with which said reference signal is to be compared and in which after a recognition of an engine knock the weighting factor k applied to said integrated digital signals with which said reference signal is compared is reduced or made zero for the computation of said reference signal for at least one combustion cycle in said engine.

4. Method of reliable and early detection of knocking in a multi-cylinder internal combustion engine by sensing, filtering and demodulating an audio frequency signal representing engine vibrations and integrating said demodulated signal during crankshaft-timed window periods, converting the resulting integrated signal from analog to digital form and then comparing the integrated digital signal with a reference signal obtained by recursive digital filtering of a succession of integrated digital signals relating to the same engine cylinder as the signal compared with said reference signal, said digital filtering being performed by applying a weighting factor k and its complement respectively to at least one pair of successive integrated digital signals of said succession, said factor k being of a magnitude dependent on the value of acceleration of engine speed, said method further comprising the steps of:

providing a minimum-value reference signal, and substituting said minimum-value reference signal for said reference signal obtained by recursive digital signal filtering whenever the former is greater than the latter.

5. Method according to claim 4, in which said minimum-value reference signal is provided with a value that is dependent upon engine speed.

6. Method according to claim 4, in which said minimum-value reference signal is separately determined for each of the cylinders of the engine and is effected by performing steps of:

storing integrated digital signals produced during an interval of time during which the engine speed is within a predetermined reference speed range, and substituting a signal so stored, which relates to the cylinder to which the contemporaneous integrated digital signal relates, for said reference signal obtained by recursive digital filtering when the latter reference signal is smaller than the corresponding stored signal.

7. Method according to claim 6, in which the step of storing is repeated with a frequency dependent on engine temperature and/or other engine operation parameters.

* * * * *